United States Patent
Lortz et al.

(10) Patent No.: US 8,313,703 B2
(45) Date of Patent: Nov. 20, 2012

(54) APPARATUS AND METHOD FOR CARRYING OUT CHEMICAL AND PHYSICAL MATERIALS TRANSFORMATIONS

(75) Inventors: Wolfgang Lortz, Waechtersbach (DE);
Karlheinz Filz, Altenstadt (DE);
Werner Will, Gelnhauser (DE); Uwe Diener, Grosskrotzenburg (DE)

(73) Assignee: Evonik Degussa GmbH, Essen (DE)

( * ) Notice: Subject to any disclaimer, the term of this patent is extended or adjusted under 35 U.S.C. 154(b) by 129 days.

(21) Appl. No.: 12/920,498

(22) PCT Filed: Mar. 5, 2009

(86) PCT No.: PCT/EP2009/052582
§ 371 (c)(1),
(2), (4) Date: Sep. 1, 2010

(87) PCT Pub. No.: WO2009/121681
PCT Pub. Date: Oct. 8, 2009

(65) Prior Publication Data
US 2011/0015281 A1      Jan. 20, 2011

(30) Foreign Application Priority Data
Apr. 2, 2008    (EP) .................................. 08103331

(51) Int. Cl.
*B01J 19/02*    (2006.01)
*B01J 19/26*    (2006.01)
*B02C 19/06*    (2006.01)
*B01F 5/02*     (2006.01)
*B01F 13/06*    (2006.01)

(52) U.S. Cl. ........ 422/129; 422/224; 422/240; 422/241; 422/242; 241/5; 241/39; 366/162.4

(58) Field of Classification Search .................. 422/129, 422/224, 240, 241, 242; 241/5, 39; 366/162.4
See application file for complete search history.

(56) References Cited

U.S. PATENT DOCUMENTS
2,327,402 A * 8/1943 Clark .......................... 241/46.15
(Continued)

FOREIGN PATENT DOCUMENTS
DE    101 41 054    3/2003
(Continued)

OTHER PUBLICATIONS
Machine Translation of DE 101 41 054 A1 (Mar. 2003).*
(Continued)

*Primary Examiner* — Jennifer A Leung
(74) *Attorney, Agent, or Firm* — Oblon, Spivak, McClelland, Maier & Neustadt, L.L.P.

(57) ABSTRACT

Reactor for carrying out chemical and physical materials transformations, which comprises a reaction space enclosed by a reactor housing, where the reactor housing has at least two lateral fluid inlets having adjustably mounted nozzles which include an angle of about 20-160 degrees and through which fluid jets which impinge on one another at a common collision point within the reaction space are passed and the reactor has a fluid outlet at the bottom of the reaction space, which is characterized in that—an exchangeable bottom plate•which has a hole as fluid outlet and•on which moveably supported spheres are located so as to block the original path of the individual fluid jets in the unaligned state rests on the bottom of the reaction space and—a half shell standing upright on the bottom of the reaction space is located between each moveably supported sphere and the wall of the reactor space and—bottom plate, half shell and moveably supported spheres comprise one or more hard materials.

16 Claims, 3 Drawing Sheets

U.S. PATENT DOCUMENTS

| | | | | |
|---|---|---|---|---|
| 2,974,886 A | * | 3/1961 | Nagel | 241/39 |
| 3,701,484 A | * | 10/1972 | Gleason | 241/5 |
| 4,768,721 A | * | 9/1988 | Niemi | 241/39 |
| 5,082,633 A | * | 1/1992 | Stuper | 422/133 |
| 5,562,253 A | * | 10/1996 | Henderson et al. | 241/5 |
| 6,138,931 A | * | 10/2000 | Geurts et al. | 241/40 |
| 6,173,798 B1 | | 1/2001 | Bryant et al. | |
| 6,368,377 B1 | | 4/2002 | Bryant et al. | |
| 2003/0230652 A1 | | 12/2003 | Lortz et al. | |
| 2007/0154738 A1 | | 7/2007 | Ganguly et al. | |
| 2008/0051473 A1 | | 2/2008 | Lortz et al. | |

FOREIGN PATENT DOCUMENTS

| | | |
|---|---|---|
| DE | 102 04 470 | 8/2003 |
| DE | 103 60 766 | 7/2005 |
| GB | 2 433 747 | 7/2007 |

OTHER PUBLICATIONS

English language translation of DE 101 41 054 A1 (Mar. 2003).*

* cited by examiner

APPARATUS AND METHOD FOR CARRYING OUT CHEMICAL AND PHYSICAL MATERIALS TRANSFORMATIONS

CROSS REFERENCE TO RELATED APPLICATIONS

This application is the National Stage of PCT/EP09/052582, filed Mar. 5, 2009, the disclosure of which is incorporated herein by reference in its entirety. This application claims priority to European Application No. 08103331.8, filed Apr. 2, 2008, the disclosure of which is incorporated herein by reference in its entirety.

BACKGROUND OF THE INVENTION

The invention relates to an apparatus and a method for carrying out chemical and physical materials transformations.

Apparatuses such as ball mills or stirred ball mills are available for producing fine dispersions. A disadvantage of these apparatuses is the abrasion of the milling media used, for example milling media composed of glass, ceramic, metal or sand. This abraded material restricts the use of the dispersions produced in this way in fields which tolerate only a low level of impurities, for example the polishing of sensitive surfaces.

Higher energy inputs are possible using a planetary kneader/mixer. However, the effectiveness of this system relies on a sufficiently high viscosity of the mixture being processed in order to introduce the necessary high shear energies for breaking up the particles.

Although very fine dispersions can be produced using high-pressure homogenizers in which a predispersion which is under high pressure impinges on armoured wall regions of a chamber, it has been found that the chamber of such an apparatus is subject to severe wear despite the armouring. Division of the predispersion into two streams which are depressurized via a nozzle and impinge precisely on one another reduces the abrasion but does not solve the problem. Centring of the predispersions directed at one another is especially difficult. Such a method is described, for example, in EP-A-766997.

EP-B-1165224 describes a method in which the abrasion in the production of dispersions is significantly reduced when the divided predispersion streams which are under high pressure are depressurized to a common collision point which is located in a gas-filled milling space far from material. This arrangement is said to minimize cavitation on walls of materials, in contrast to the abovementioned high-pressure apparatuses which operate in a liquid-filled milling space. The gas stream here also takes on the task of transporting the dispersion from the milling space and cooling the dispersion. A disadvantage of this method is the work-up of the gas/dispersion mixtures. To achieve economically viable throughputs, large amounts of gas have to be used. The separation of this gas from the dispersion requires an increased outlay in terms of apparatus, for example appropriately dimensioned degasers. The reduced thermal conductivity resulting from the high proportion of gas requires larger and thus more expensive cooling facilities in the event of cooling of the mixture being required.

DE-C-10204470 describes the use of steam as gas. Here too, the collision of the particles to be dispersed takes place in a space far from materials. The use of steam enables the disadvantages of the method of EP-B-1165224 in which large amounts of gas have to be removed from the reaction mixture to be avoided. Nevertheless, even in the method of DE-C-10204470, it is found that maintenance of a gas atmosphere during dispersion is not economically viable.

DE-A-10360766 describes a method in which the milling space is flooded with a predispersion, as a result of which the work-up of mixtures of gas and dispersion can be avoided.

DE-A-10141054 describes a reactor in which, after alignment of the fluid jets, rotatably supported hard bodies, for example ceramic spheres, are additionally introduced into the path of the jet. This leads to the fluid jets not impinging on the reactor wall in the event of alignment being lost and thus leading to destruction of the entire reactor, but merely impinging on the replaceable ceramic spheres. However, it has been found that the effect of such an apparatus is only short-term since the movement of the rotatably supported hard bodies likewise results in abrasion at places in the reactor where the hard bodies are positioned and contact the wall. As a consequence, the loss of alignment of the fluid jets caused thereby leads to further damage to the reactor.

All the apparatuses mentioned in which physical or chemical materials transformations are carried out under high pressure have the disadvantage that abrasion of material occurs under the extreme conditions. This firstly contaminates the reaction product and, secondly, such a reactor cannot be operated economically.

SUMMARY OF THE INVENTION

It was therefore an object of the present invention to provide a reactor by means of which physical or chemical materials transformations can be carried out under high pressure over a long period of time without a critical abrasion of material and loss of alignment of the path of the jets occurring.

DETAILED DESCRIPTION OF THE PREFERRED EMBODIMENTS

Figure 1A:
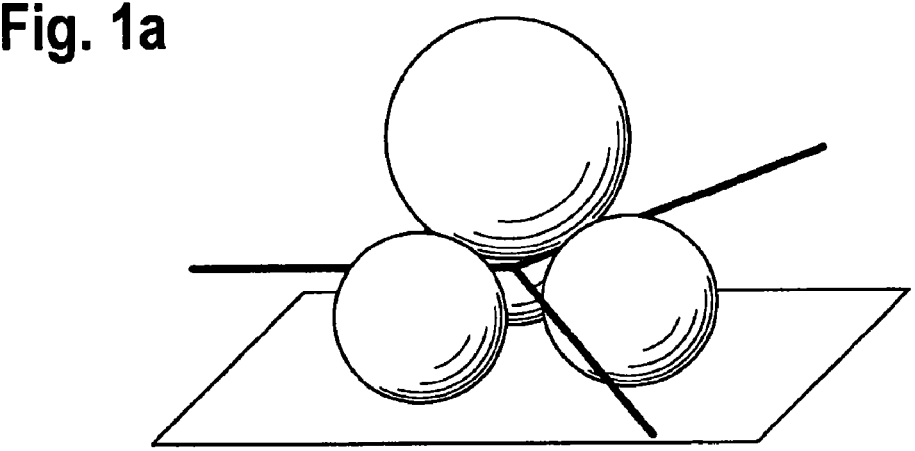
FIG. 1a shows one embodiment of the invention having a sphere superposed on the moveable spheres.

The object of the invention is achieved by a reactor for carrying out chemical and physical materials transformations, which comprises a reaction space enclosed by a reactor housing, where the reactor housing has at least two lateral fluid inlets having adjustably mounted nozzles which include an angle of about 20-160 degrees and fluid jets which are preferably located in a plane are passed through the nozzles and impinge on one another at a common collision point within the reaction space and the reactor has a fluid outlet at the bottom of the reaction space, which is characterized in that a bottom plate which has a hole as fluid outlet and on which moveably supported spheres are located so as to block the original path of the individual fluid jets in the unaligned state rests on the bottom of the reaction space and a half shell standing upright on the bottom of the reaction space is located between each moveably supported sphere and the wall of the reactor space and bottom plate, half shell and moveably supported spheres comprise one or more hard materials.

As a result of the design of the reactor of the invention, the moveably supported spheres are in contact only with the bottom plate and half shell which comprise a hard material. The bottom plate resting on the bottom of the reaction space and the half shells can be made exchangeable, so that simple replacement is possible after very long reaction times.

The invention makes it possible for the actual reactor housing to be made of a customarily used material, for example stainless steel, while only bottom plate, half shell and moveably supported spheres comprise one or more hard materials.

A hard material for the purposes of the invention is a material whose hardness on Moh's scale is at least 7.5, preferably at least 8. Suitable materials are, in particular, hardened metals, metal carbides, metal nitrides, metal borides, boron carbide and zirconium dioxide, α-alumina and sapphire.

In a preferred embodiment, the bottom plate resting on the bottom of the reactor and the half shells are characterized in that the hard material is composed of tungsten carbide particles in a nickel matrix or cobalt matrix. These materials are also characterized in that they are relatively easy to work by erosion processes such as wire and spark erosion. Owing to the high chemical resistance, tungsten carbide particles in a nickel matrix are particularly preferred.

The moveably supported spheres preferably comprise α-alumina, sapphire, ruby or metal nitrides as hard material. Silicon nitride can be particularly preferred.

In a particular embodiment of the reactor of the invention, a further sphere or a cylinder is located on the spheres supported moveably on the bottom plate. The sphere or cylinder is dimensioned so that it has a contact point with each of the movable spheres supported on the bottom plate. Sphere and cylinder stabilize the position of the movable spheres supported on the bottom plate. Further stabilization can be achieved by spring loading of the supported spheres.

In a particular embodiment, the cylinder can be provided with a hole from end face to end face so that a further fluid or gas can be directed through this hole directly at the collision point and physical or chemical materials transformations can be additionally achieved in this way.

The spheres advantageously likewise comprise a hard material.

Figure 1B:
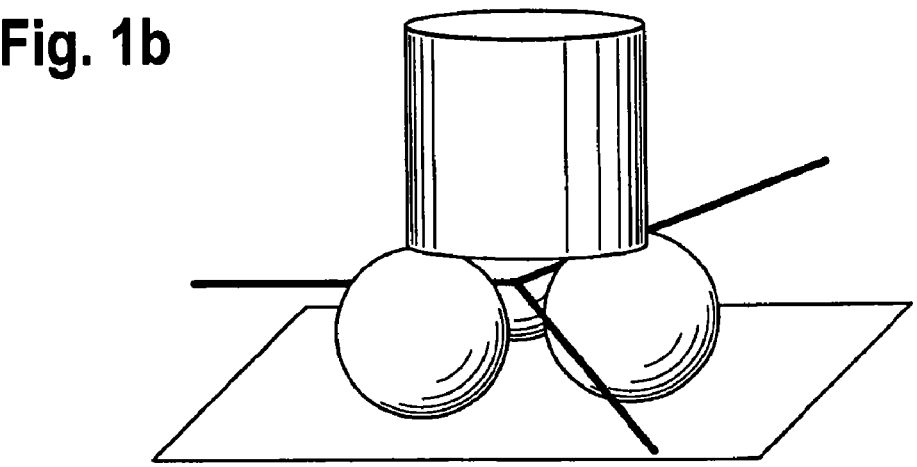
FIG. 1b shows one embodiment of the invention having a cylinder superposed on the moveable spheres.

FIG. 1a shows the embodiment for the example of three spheres moveably supported on the bottom plate and an additional superposed sphere. The arrows represent the fluid jets which impinge on a common collision point. FIG. 1b shows a superposed cylinder.

The cylinder has the additional advantage that alignment of the fluid jets is simpler than in the case of the sphere. Furthermore, the cylinder can have an additional hole via which a further material can be introduced into the reaction space.

The number of movable spheres supported on the bottom plate is at least three, corresponding to three fluid jets which collide at a common point. However, 4, 5 or 6, for example, spheres can rest on the bottom plate, corresponding to 4, 5 or 6 fluid jets.

The bottom plate itself can have dish-like depressions in which the moveably supported spheres rest. This too can stabilize the position of the spheres. The dish-like depression is advantageously dimensioned so that about 2.5%-25% of the radius of the sphere dips into the depression.

The invention further provides a method of carrying out chemical and physical materials transformations, in which a liquid medium is placed under a pressure of from 50 to 4000 bar and depressurized via the fluid inlets of the reactor of the invention via nozzles to a common collision point and is discharged from the reactor through an opening in the bottom plate and the bottom of the reactor.

For the purposes of the present invention, chemical and physical materials transformations are, for example, homogenization, emulsification, particle comminution, deaggregation and deagglomeration.

The method of the invention is particularly suitable for producing dispersions.

Figure 2A:
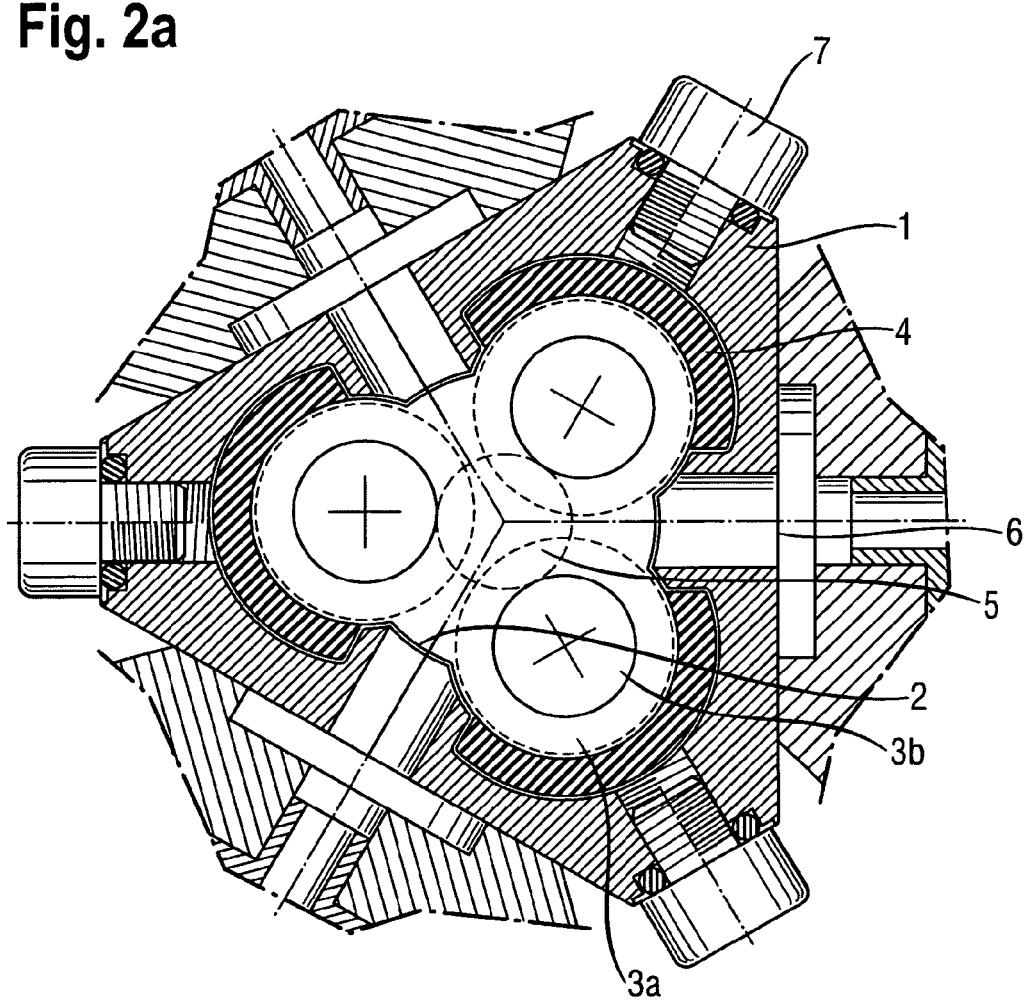
FIG. 2a shows a cross section through a reactor according to one embodiment of the invention.
Figure 2B:
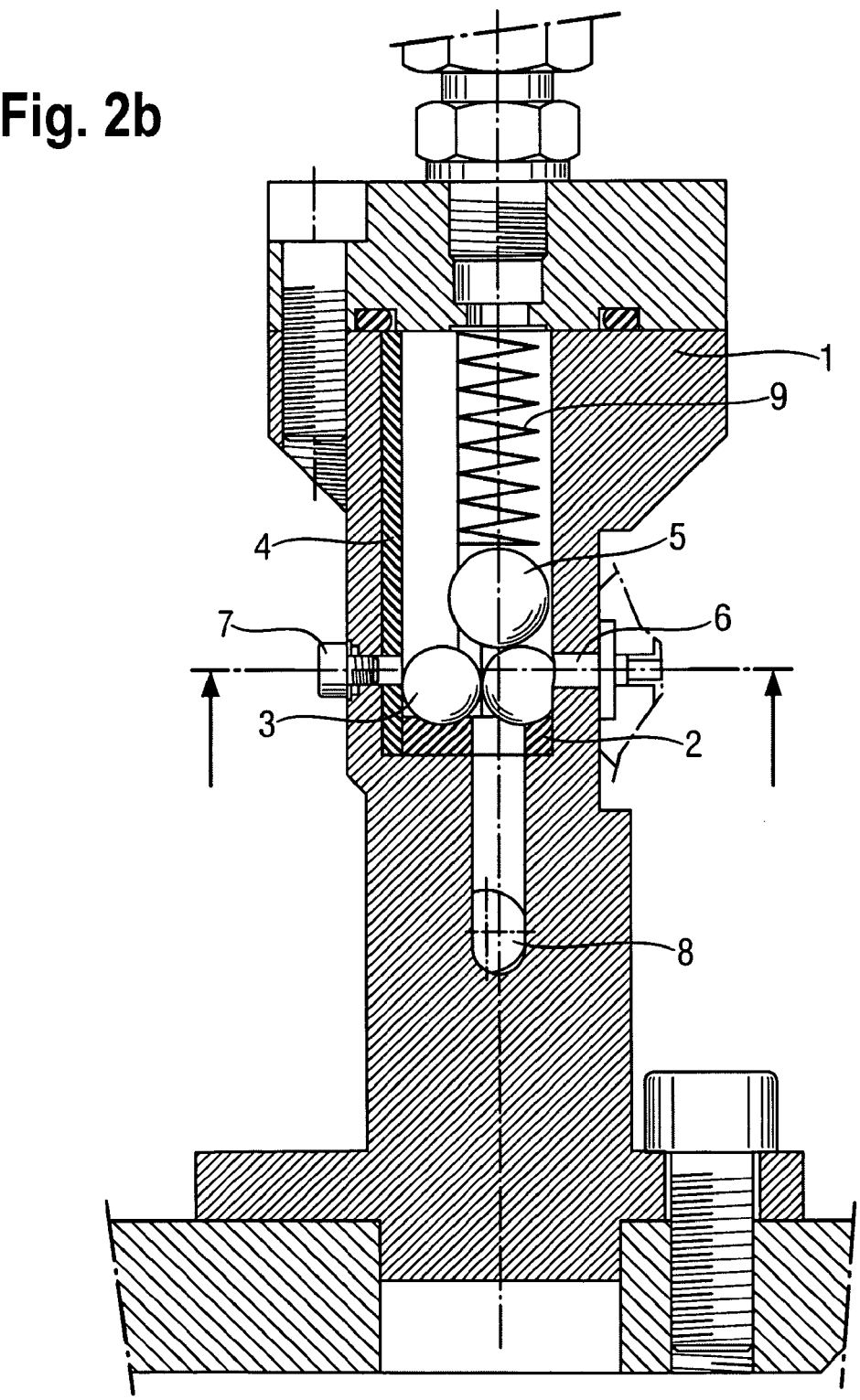
FIG. 2b shows a reactor according to one embodiment of the invention.

FIG. 2a shows a cross section through a reactor according to the invention, where:

1=reactor housing
2=bottom plate
3a=movable sphere (broken line) supported on the bottom plate,
3b=rim of the depression in which the movable sphere rests on the bottom plate (continuous circle)
4=half shell
5=fluid outlet
6=fluid inlet
7=closed fluid outlets FIG. 2b shows a longitudinal section through a reactor according to the invention, where 1=reactor housing
2=bottom plate
3=moveable sphere supported on the bottom plate
4=half shell
5=supported sphere
6=fluid inlet
7=closed fluid outlets
8=fluid outlet
9=spring.

The invention claimed is:

1. A reactor for carrying out chemical and physical materials transformations, which comprises:

a reaction space enclosed by a reactor housing;

resting on the bottom of the reaction space, an exchangeable bottom plate comprising a hole as a fluid outlet and, upon the exchangeable bottom plate, rotationally moveable supported spheres, located so as to block an original path of individual fluid jets in an unaligned state; and standing upright on the bottom of the reaction space, between each moveably supported sphere and the wall of the reactor space, a half shell, wherein the reactor housing comprises at least two lateral fluid inlets comprising adjustably mounted nozzles at an angle of about 20-160 degrees and through which fluid jets which impinge on one another at a common collision point within the reaction space are passed and the reactor has a fluid outlet at a bottom of the reaction space, and the bottom plate, the half shell, and the moveably supported spheres comprise at least one hard material.

2. The reactor according to claim 1, wherein the at least one hard material of the bottom plate and of the half shell comprises tungsten carbide particles in a nickel matrix or cobalt matrix.

3. The reactor according to claim 1, wherein the rotationally moveable supported spheres on the bottom plate are superposed by a further sphere or a cylinder.

4. The reactor according to claim 1, wherein the bottom plate comprises depressions in the form of dishes in which the rotationally moveable supported spheres rest.

5. The reactor according to claim 1, wherein the at least two lateral fluid inlets located on a wall in the reactor housing are located in a plane.

6. A method of carrying out chemical and physical materials transformations, comprising
placing a liquid medium under a pressure of from 50 to 4000 bar;
allowing the liquid medium to depressurize via the fluid inlets of the reactor according to claim 1 via nozzles to a common collision point; and
discharging a transformed material from the reactor through the opening in the bottom plate and the bottom of the reactor.

7. The reactor according to claim 3, wherein the bottom plate comprises depressions in the form of dishes in which the rotationally moveable supported spheres rest.

8. The reactor according to claim 2, wherein the at least two lateral fluid inlets located on a wall in the reactor housing are located in a plane.

9. The reactor according to claim 3, wherein the at least two lateral fluid inlets located on a wall in the reactor housing are located in a plane.

10. The reactor according to claim 4, wherein the at least two lateral fluid inlets located on a wall in the reactor housing are located in a plane.

11. The reactor according to claim 7, wherein the at least two lateral fluid inlets located on a wall in the reactor housing are located in a plane.

12. The reactor according to claim 4, wherein the depressions are each so configured such that about from 2.5 to 25% of a radius of each sphere is located within a depression.

13. The reactor according to claim 12, wherein the rotationally moveable supported spheres are superposed by a further sphere or a cylinder such that each of the spheres has a point of contact with the cylinder or sphere.

14. The reactor according to claim 1, wherein the rotationally moveable spheres are spring loaded.

15. The reactor according to claim 13, wherein the further sphere or cylinder superposed on the rotationally moveable spheres is spring loaded.

16. The reactor according to claim 13, wherein the rotationally moveable supported spheres are superposed by a cylinder and the cylinder comprises a hole which allows for introduction of a further material to the reaction space.

* * * * *